United States Patent

[11] 3,633,196

| [72] | Inventors | Erhard Winkler<br>Bern;<br>Adrian Allemann, Welschenror; Max<br>Oberholzer, Liebefeld, all of Switzerland |
|---|---|---|
| [21] | Appl. No. | 879,800 |
| [22] | Filed | Nov. 25, 1969 |
| [45] | Patented | Jan. 4, 1972 |
| [73] | Assignee | Hasler AG<br>Bern, Switzerland |
| [32] | Priority | Nov. 25, 1968 |
| [33] | | Switzerland |
| [31] | | 17492/68 |

[54] SIGNAL LAMP MONITORING CIRCUIT
5 Claims, 1 Drawing Fig.

[52] U.S. Cl. .................................... 340/251, 340/256
[51] Int. Cl. ............................................ G08b 21/00

[50] Field of Search ............................................ 340/251

[56] References Cited
UNITED STATES PATENTS
3,421,157  1/1969  Atkins .................... 340/251

*Primary Examiner*—Donald J. Yusko
*Assistant Examiner*—Daniel Myer
*Attorney*—Brady, O'Boyle & Gates ABSTRACT: A circuit for monitoring the readiness for functioning of at least one DC operated signal lamp, the circuit comprising a pulse generator for supplying test pulses through a logic system to a switching transistor; the signal lamp being operated by the switching transistor when a signal voltage is applied to the transistor through the logic system. An indicating circuit is connected to the pulse generator and the transistor to provide a fault indication if a voltage, which does not correspond to the switching state of the transistor determined by the test pulse, occurs on the connection between the lamp and the transistor during each test pulse.

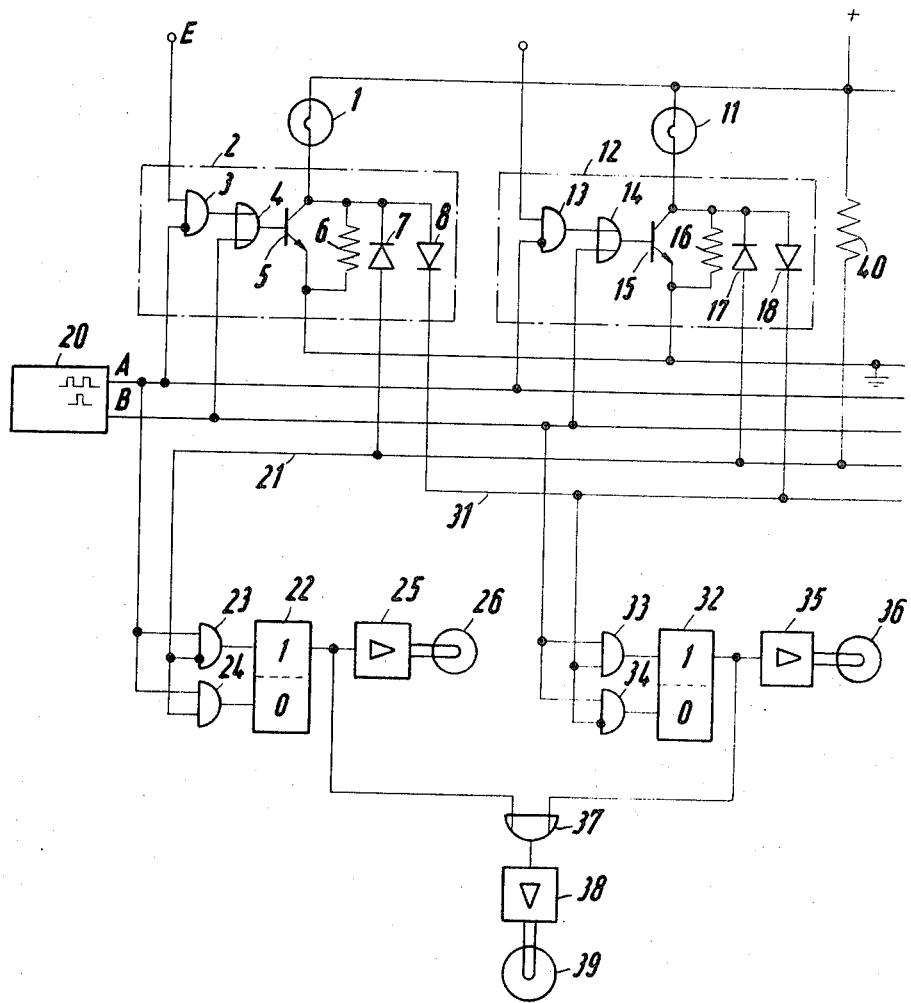
Inventors
ERHARD WINKLER
ADRIAN ALLEMANN
MAX OBERHOLZER
BY Brady, O'Boyle & Gates
ATTORNEYS

SIGNAL LAMP MONITORING CIRCUIT

The invention relates to a circuit for monitoring the readiness for functioning of at least one signal lamp which is supplied with DC via a switching transistor, controlled by a signal voltage.

If the appearance of the signal voltage is to result in a reliable illumination of the signal lamp it will be necessary for the readiness to function thereof to be continuously monitored, that is to say even if no signal voltage occurs so that a defect of the signal lamp as well as a defect of its monitoring circuit is indicated.

To this end it is the purpose of the invention to provide a monitoring circuit.

The monitoring circuit according to the invention is provided with a pulse transmitter which supplies the switching transistor with test pulses adapted to briefly operate said switching transistor independently of the signal voltage so that no flickering of the signal lamp is noticeable, also an indicating circuit, adapted to provide a fault indication if a voltage, not corresponding to the transistor and signal lamp circuit condition predetermined by the test pulse, occurs on the switching connection of the transistor during each such test pulse.

An embodiment of the object of the invention is described hereinbelow by reference to the accompanying drawing. The single illustration shows a control and monitoring circuit for two signal lamps.

In the drawing, the two signal lamps are designated with the numerals 1 and 11. Each of the aforementioned signal lamps 1 and 11 is associated with a dot-dash framed control circuit 2 or 12 respectively with a switching transistor 5 or 15 respectively for controlling the signal lamp 1 or 11 respectively and for supplying pulses to a monitoring circuit 23 to 26 and 33 to 39, which, together with the control circuits 2 and 12, form a fault-indicating circuit. The control circuits 2 and 12 and the monitoring circuit 23 to 26 and 33 to 39 operate in binary manner, that is to say with two different states, the more positive state being designated by the figure 1 and the more negative state by 0 in the description hereinbelow.

The control circuit 2 has a signal voltage input E which is connected to the base of the switching transistor 5 via a NAND-gate (AND gate with an inhibitor input) 3 and an OR-gate 4. The signal lamp 1 is connected between the positive terminal of the supply voltage and the collector of the transistor 5 to whose emitter the reference voltage of the circuit is applied. The emitter-collector path of the transistor 5 is shunted by a resistor 6 of such value that a current flowing therethrough does not cause the lamp 1 to be illuminated. The signal lamp 1 is supplied via said resistor 6 with a quiescent current which reduces the starting current surges. This resistor is provided to protect the signal lamp but is not essential. A pulse generator 20 supplies pulses to the line A, said pulses being of very short duration (for example 0.001 sec.) relative to the pulse interval (for example 0.2 sec.).

In the quiescent condition the line A is in the state 0 so that a 1 state from the input E (signal voltage) is transferred by the NAND-gate 3 and the OR-gate 4 to the base of the transistor 5 to cause the signal lamp 1 to be illuminated.

A pulse which appears on the line A drives the NAND-gate 3 to cutoff so that the base of the transistor 5 is provided with the state 0 irrespective of the presence of a signal voltage. If the signal lamp 1 conducts current when said pulse occurs, the current will be interrupted during said pulse and ensuing pulses for periods which are so short as to preclude visual detection. If the signal lamp 1 conducts no current, when said pulse occurs, it will do so also during the pulse.

If the signal lamp 1 is not defective the supply voltage of the circuit (state 1) will appear at the collector of the transistor 5 during each of the A pulses. However, if the filament of the signal lamp 1 is open the reference potential (state O) will appear at the collector of the transistor 5 even if as the result of a defect of the transistor 5 or one or both gates 3 and 4 the transistor 5 is not driven to cutoff for the duration of the A pulses.

The signal lamp 1 is therefore not lit but ready for use and the circuit part comprising the gates 3 and 4 and the transistor 5 and being responsible for the operation of the signal lamp will be ready for functioning as far as the blocking action of the transistor 5 is concerned, only if the collector of transistor 5 is at the state 1 during the A pulse. This also applies correspondingly to the signal lamp 11 and to the control circuit 12 associated therewith.

A diode 7 and 17 respectively is connected between the collector of the transistor 5 and 15 respectively and a line 21 which is connected to the positive terminal of the circuit via a resistor 40. The diodes 7 and 17 form an AND gate at whose output (line 21) the state 1 occurs during each A pulse only if the signal lamp 1 and 11 are capable of functioning (no filament interrupting) and the circuit parts comprising the gates 3 and 4 or 13 and 14 respectively and the transistor 5 or 15 respectively are capable of operating as described above.

The lines A and 21 are connected to a first indicating circuit 23 to 26 containing a bistable multivibrator 22 preceded by a NAND-gate 23 and an AND-gate 24 followed by an amplifier 25 adapted to feed a fault indicating lamp 26. If the line 21 is at the state 1 during an A pulse, the gate 23 will be driven to cutoff and the gate 24 will be conductive so that the bistable multivibrator 22 is set to 0 and the amplifier 25 does not receive any input voltage so that the fault indicating lamp 26 is not illuminated. However, if the line 21 is at the state 0 during an A pulse the gate 24 will be driven to cutoff and the gate 23 will be conductive so that the bistable multivibrator 22 is set to 1 and the amplifier 25 causes the fault indicating lamp 26 to be illuminated.

That part of the circuit described hereinabove indicates faults due to fracture of the filament of one or both signal lamps 1 and 11 or faults which are due to the fact that the circuit part comprising the gates 3, 4 or 13, 14 respectively and the transistor 5 or 15 respectively does not interrupt the supply of current to the signal lamp 1 or 11 respectively for the duration of an A pulse.

In order to monitor the circuit part 3, 4, 5 or 13, 14, 15 to ascertain its capability of correctly supplying current to the signal lamp 1 or 11 respectively, the pulse generator 20 supplies during each pulse interval between the A pulses a pulse which is transmitted to the line B, an OR gate, comprising two diodes 8 and 18 as well as a second indicating circuit 32 to 36 being also provided. The aforementioned second indicating circuit differs from the first indicating circuit 22 to 26 by virtue of the fact that the gates 33 and 34 at the input of the bistable multivibrator 32 are interchanged by comparison with the gates 23 and 24 at the input of the bistable multivibrator 22 and that the gates 33 and 34 are provided with B pulses and pulses from a line 31.

Each B pulse (1 state) reaches the bases of the transistors 5 and 15 respectively via the OR-gates 4 and 14 respectively, irrespective of the presence of a signal voltage, so that the aforementioned transistors are rendered conductive irrespective of the presence of a signal voltage and their collectors obtain the state 0, provided that the gates 4 and 14 respectively and the transistors 5 and 15 respectively are functional in this sense. In such a case no voltage will appear on the line 31 so that the B pulse sets the bistable multivibrator 32 to 0 so that the amplifier 35 is not provided with an input voltage and accordingly the fault indicating lamp 36 is not illuminated. However, if the gate 4 or 14 respectively, the transistor 5 or 15 respectively or a plurality of the aforementioned circuit elements are not capable of function in the sense described hereinabove, the collector of the transistor 5 and/or of the transistor 15 will be in the state 1 during the B pulse, provided that the signal lamp 1 or 11 is not defective (a defect of such kind would already be indicated by the fault indication lamp 26). The gate 34 is then driven to cutoff, the gate 33 is rendered conductive, the bistable multivibrator 32 is set to 1 and the fault indicating lamp 36 is illuminated.

The B pulses are of such short duration that they do not cause any visible illumination of the signal lamps 1 and 11.

As already described hereinabove, in the event of a defect in the readiness for functioning of one or both signal lamps 1 and 11 (that is to say in the event of filament fracture or a defect in the monitoring circuit) the fault-indicating lamp 26 or the fault-indicating lamp 36 will be illuminated, depending on the cause of the fault. In order to obtain functionality fault indication irrespective of the kind of cause, the 1 outputs of the two bistable multivibrators 22 and 32 of the exemplified embodiment are connected to the inputs of an OR-gate 37 whose outputs are connected to an amplifier 38 and a fault indication lamp 39 which indicates any defect in the functionality of the signal lamps 1 and 11 independently of the cause. It is of course possible for either the amplifiers 25 and 35 and the fault-indicating lamps 26 and 36 or for the OR-gate 37, the amplifier 38 and the fault-indicating lamp 39 to be omitted if only one indication, independent of the kind of fault, is required or if only one indication, dependent on the kind of fault, is required.

The brightness of the signal lamps 1 and 11 may be regulated without any substantial additional effort by means of the monitoring circuit described hereinabove, for example it may be increased if the ambient zone has a great brightness or it may be reduced if the ambient zone has a low brightness. To this end the pulse generator 20 must be so constructed that the pulse ratio (pulse duration : pulse interval) of the A pulses is rendered adjustable, flickering of the signal lamps 1 and 11 being avoided by selecting a suitably high pulse frequency, for example 50 cycles per second.

Instead of being used for two signal lamps as in the illustrated example, the monitoring circuit described hereinabove can also be constructed for only one signal lamp or for any desired number of signal lamps. Each signal lamp must be associated with a control circuit corresponding to the control circuit 2 or 12 and must be connected in the same way as the control circuits 2 and 12 to the reference line and the lines A, B, 21 and 31. The circuit parts 22 to 24 and 32 to 34 as well as the circuit parts 25, 26, 35, 36 and/or 37, 38, 39 and the pulse generator 20 are only required once for all signal lamps and their control circuits.

We claim:
1. An electric lamp monitoring circuit comprising,
a direct current source (+, 0),
a signal lamp (1),
a control transistor (5) having a control input and a switching path connected in series circuit with said signal lamp and direct current source,
a control voltage input (E),
a pulse generator (20) for generating a stream of test pulses (A),
gating means (3) connecting said control voltage input (E) to the control input of said transistor (5) and connected to said pulse generator to receive said test pulses (A) for driving said transistor (5) to its cutoff state with each of said test pulses,
sensing means (23) connected to said pulse generator (20) to be actuated by said stream of test pulses and connected to said transistor for response to the no-voltage condition across the switching path of said transistor (5), and
indicating means (22, 26) connected to be actuated by said sensing means (23).

2. An electric lamp monitoring circuit as set forth in claim 1 in which said pulse generator (20) is adjustable to vary the pulse ratio of said stream of test pulse (A) to adjust the brightness of said signal lamp (1).

3. An electric lamp monitoring circuit comprising,
a direct current source (+, 0),
a signal lamp (1),
a control transistor (5) having a control input and a switching path connected in series circuit with said signal lamp and direct current source,
a control voltage input (E),
a pulse generator (20) operative to deliver a first (A) and a second stream (B) of interleaving pulses,
gating means (3, 4) connecting said control voltage input (E) to the control input of said transistor (5) and connected to said pulse generator for control by said first and second pulse streams (A, B) for driving said transistor (5) to its cutoff state with each pulse of said first pulse stream (A) and to its conducting state with each pulse of said second pulse stream (B),
first sensing means (23) connected to said pulse generator (20) to be actuated by each pulse of said first pulse stream (A) and connected to said transistor for response to the no-voltage condition across said switching path of said transistor (5),
second sensing means (33) connected to said pulse generator (20) to be actuated by each pulse of said second pulse stream (B) and connected to said transistor for response to the presence of a voltage across said switching path of said transistor (5), and
first (22, 26) and second (32, 36) indicating means connected to be actuated by said first (23) and said second (33) sensing means respectively.

4. An electric lamp monitoring circuit comprising,
a direct current source (+, 0),
a plurality of signal lamps (1, 11),
a plurality of control transistors (5, 15) each having a control input and each having a switching path connected in series circuit with a respective one of said plurality of signal lamps (1, 11) and said direct current source (+, 0),
a plurality of control voltage inputs (E) each assigned to one of said plurality of signal lamps (1, 11),
a pulse generator (20) for generating a stream of test pulses (A),
a plurality of gating means (3, 13) each connecting a respective one of said plurality of control voltage inputs (E) to the control input of a respective one of said plurality of control transistors (5, 15) and each of said plurality of gating means connected to said pulse generator to receive said stream of test pulses (A) for driving said transistors to their cutoff state with each of said test pulses,
sensing means (23) connected to said pulse generator (20) to be actuated by said stream of test pulses (A) and connected to said plurality of control transistors (5, 15) for response to the no-voltage condition across the switching path of any of said transistors (5, 15), and
indicating means (22, 26) connected to be actuated by said sensing means (23).

5. An electric lamp monitoring circuit comprising,
a direct current source (+, 0),
a plurality of signal lamps (1, 11),
a plurality of control transistors (5, 15), each having a control input and each having a switching path connected in series circuit with a respective one of said plurality of signal lamps (1, 11) and said direct current source (+, 0),
a plurality of control voltage inputs (E) each assigned to one of said plurality of signal lamps (1, 11),
a pulse generator (20) operative to deliver a first (A) and a second stream (B) of interleaving pulses,
a plurality of gating means (3, 4; 13, 14) each connecting a respective one of said plurality of control voltage inputs (E) to the control input of a respective one of said plurality of control transistors (5, 15) and connected to said pulse generator for control by said first and second pulse streams (A, B) for driving said plurality of transistors (5, 15) to their cutoff state with each pulse of said first pulse stream (A) and to their conducting state with each pulse of said second pulse stream (B),
first sensing means (7, 17, 40, 23) connected to said pulse generator (20) to be actuated by each pulse of said first pulse stream (A) and connected to said plurality of control transistors (5, 15) for response to the no-voltage condition across the switching path of any of said transistors (5, 15), second sensing means (8, 18, 33) connected to said pulse generator (20) to be actuated by each pulse of said second pulse stream (B) and connected to said plurality of control transistors (5, 15) for response to the presence of a voltage across the switching path of any of said transistors (5, 15), and first (22, 26) and second (32, 36) indicating means connected to be actuated by said first (7, 17, 40, 23) and second (8, 18, 33) sensing means respectively.

* * * * *